US007771507B2

(12) United States Patent
Sorrentino et al.

(10) Patent No.: US 7,771,507 B2
(45) Date of Patent: *Aug. 10, 2010

(54) HYDRAULIC MINERAL COMPOSITION, PRODUCTION METHOD THEREOF AND HYDRAULIC BINDERS AND CEMENTITIOUS PRODUCTS CONTAINING ONE SUCH COMPOSITION

(75) Inventors: François Sorrentino, Meyzieu (FR); Michel Gimenez, Diemoz (FR)

(73) Assignee: LaFarge, Paris (FR)

( * ) Notice: Subject to any disclaimer, the term of this patent is extended or adjusted under 35 U.S.C. 154(b) by 1031 days.

This patent is subject to a terminal disclaimer.

(21) Appl. No.: 10/583,549

(22) PCT Filed: Dec. 16, 2004

(86) PCT No.: PCT/FR2004/050717

§ 371 (c)(1),
(2), (4) Date: Jun. 19, 2006

(87) PCT Pub. No.: WO2005/061406

PCT Pub. Date: Jul. 7, 2005

(65) Prior Publication Data

US 2007/0144404 A1 Jun. 28, 2007

(30) Foreign Application Priority Data

Dec. 18, 2003 (FR) .................. 03 51118

(51) Int. Cl.
*C21B 3/02* (2006.01)
*C21B 5/02* (2006.01)
*B32B 5/16* (2006.01)
(52) U.S. Cl. ........................ 75/306; 428/208
(58) Field of Classification Search ............. 75/306; 428/208

See application file for complete search history.

(56) References Cited

U.S. PATENT DOCUMENTS

| 4,605,443 A | | 8/1986 | MacDowell |
| 4,756,761 A | | 7/1988 | Philip et al. |
| 5,374,309 A | * | 12/1994 | Piniecki ............... 106/714 |
| 6,758,896 B2 | * | 7/2004 | Kunbargi .............. 106/692 |
| 2004/0216644 A1 | * | 11/2004 | Morioka et al. ........ 106/789 |

FOREIGN PATENT DOCUMENTS

| DE | 104 282 | | 3/1974 |
| JP | 10-218654 | * | 8/1998 |
| JP | 10-218655 | * | 8/1998 |
| WO | WO/03/016234 | * | 2/2003 |
| WO | WO 03/068700 | | 8/2003 |

OTHER PUBLICATIONS

Patent Abstracts of Japan, vol. 1998, No. 13, Nov. 30, 1998 & JP 10 218654 A (Chichibu Onoda Cement Corp), Aug. 18, 1998 abstract.

* cited by examiner

*Primary Examiner*—Jerry Lorengo
*Assistant Examiner*—Shuangyi Abu Ali
(74) *Attorney, Agent, or Firm*—Pillsbury Winthrop Shaw Pittman, LLP

(57) ABSTRACT

The invention relates to a hydraulic mineral composition which is characterized in that it comprises a vitreous or crystallised matrix based on magnesium and calcium silico-aluminates which represent at least 25 wt.-%, and preferably 30 wt.-%, of the composition, one or more mineral oxides and optionally one or more specific mineral halides which are selected from among the oxides and halides of Ti, V, Cr, Mn, Co, Ni, Cu, Pb, Ba, Sr, P, S, Na, K, Zr, Mo, Be, Tl, As, Sn and Cd and which represent at least 5 wt.-% of the composition, at most 31 wt.-% alumina ($Al_2O_3$), less than 10 wt.-% ferrite, and less than 0.05 wt.-%, and preferably less than 0.01 wt.-%, C in relation to the weight of the composition.

14 Claims, 1 Drawing Sheet

Figure 1:
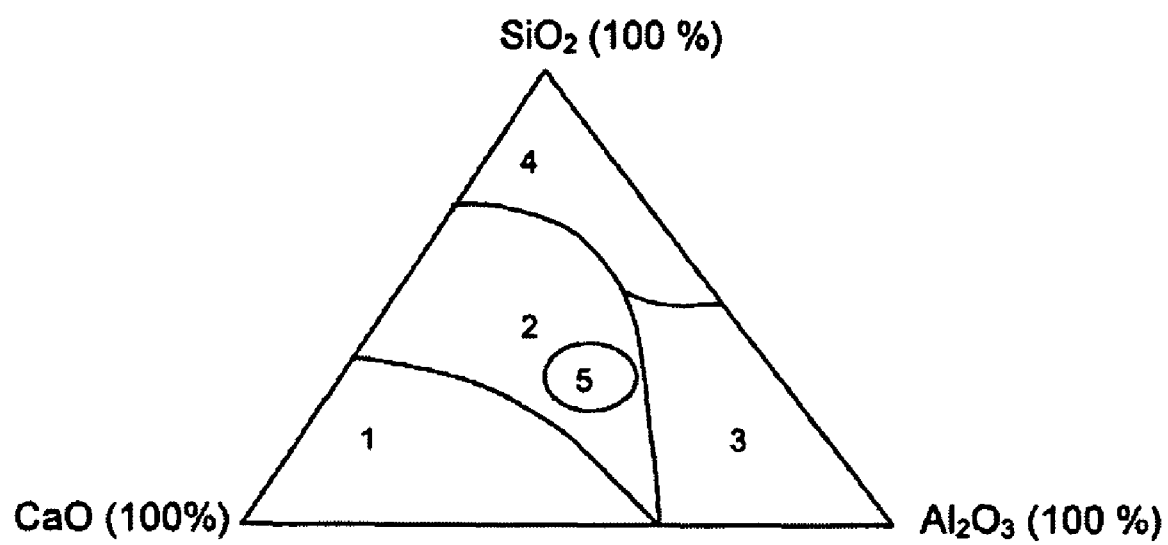

HYDRAULIC MINERAL COMPOSITION, PRODUCTION METHOD THEREOF AND HYDRAULIC BINDERS AND CEMENTITIOUS PRODUCTS CONTAINING ONE SUCH COMPOSITION

This invention relates, in general, to a hydraulic mineral composition, which can be obtained from slag, particularly from steelworks, and dust from industrial furnaces and power stations (fly ash) which have an increased activity index (AI) and to its production method.

More particularly, the invention relates to the development of a new hydraulic composition, that can be substituted for clinker, is economic to produce and has an increased activity index, based on incorporating specific mineral oxides, and optional mineral halides, into a matrix based on calcium and magnesium silico-aluminates so as to increase the total content of these mineral oxides and optional mineral halides over a fixed minimum value.

Most currently produced cements are composed of CaO, $SiO_2$, $Al_2O_3$, $Fe_2O_3$, MgO, $SO_3$ and of smaller proportions of $K_2O$, $Na_2O$, $TiO_2$. The absence of phase diagrams including all these oxides has led to the practice of representing these cements in a simplified diagram CaO, $SiO_2$, $Al_2O_3$, MgO, iron oxides or, by simplifying further, CaO, $SiO_2$, $Al_2O_3$, which are the oxides present in the greatest proportions. These cements are those in the category of Portland cements (calcium silicate-based), aluminous cements (calcium aluminate-based), and calcium sulphur-aluminates.

In order to modify the properties of these cements and also for economic and environmental reasons, it is possible to replace the cement with products that are not themselves hydraulic (i.e. that do not react with water to give stable hydrates and develop mechanical properties) but which, combined with Portland cement clinker, for example, will develop stable hydrates, and thus lasting mechanical or chemical resistances. These products are most often by-products of other industries such as the steel industry (slag), or electric power stations (fly ash). It is also possible to use natural products such as pozzolana which is essentially a silico-aluminate usually of volcanic origin.

These additives are limited in quality and quantity by their origin. The tonnage and composition of by-products (slag, ash, etc.) is determined by the main activity of the corresponding industry, and those of natural products (pozzolana) by the existence of natural resources. In the latter case, for example, the problem can be solved by manufacturing artificial pozzolana by calcinating kaolin type clay. In other cases, the cement producer wanting to control the quality of these substitutes has to purchase or manufacture synthetic products. For the operation to be economically viable, it is often necessary to use by-products or waste as the raw material.

This is the case for patent WO 03/068700 in which the authors manufacture a product with a chemical and mineralogical composition similar to that of blast furnace slag. In this case, they mainly use cement dust and/or coal ash as raw materials. It is possible to adjust the composition of the product using other raw materials such as steelworks slag or incinerator clinker.

Ash from electric power stations can also be used as described in U.S. Pat. No. 3,759,730. This ash is smelted at temperatures of around 1500° C. and metallic iron is separated from the silico-aluminate phase.

The problem that then arises is to determine the chemical and mineralogical composition which will lead to the best product, i.e. which will develop the best properties, for example either the best mechanical performance, or the best resistance to chemical aggression.

It is known, from prior art, that certain areas within the CaO, $SiO_2$, $Al_2O_3$ composition diagram must have a vitreous character to be able to be a cement substitute. This necessitates the use of a smelting process and not a sintering process and a cooling system the rapidity of which must be proportional to the slope of the viscosity graph of the liquid as a function of temperature.

In other cases, it is possible to obtain vitreous products which are themselves hydraulic and so do not need cement added. This has been developed in U.S. Pat. No. 4,605,443 which defines an area in the $CaO/Al_2O_3/SiO_2$ composition diagram within which it is possible to obtain these cements. The area is defined by CaO between 44.82 and 52.90, $SiO_2$ between 13.42 and 18.1%, $Al_2O_3$ between 29.85 and 32.87, and components such as $TiO_2$, $K_2O$, $Na_2O$, $ZrO_2$ comprised between 0.21 and 4.18%.

In certain parts of the diagram, which correspond to industrial cements (Portland or aluminates), it is not useful to have a high percentage of glass, because the minerals formed—di- and tri-calcium silicates, calcium aluminates—are already hydraulic products.

In the case of tricalcium silicate, rapid cooling is nevertheless necessary in order to avoid it decomposing into dicalcium silicate, which has a lower reactivity.

In order to have the best performance of cements, manufacturers need to know the area of chemical and mineralogical composition in which the product needs to be found.

FIG. 1 is a simplified CaO, $SiO_2$, $Al_2O_3$ phase diagram.

As shown in FIG. 1, the simplified CaO, $SiO_2$, $Al_2O_3$ diagram can be divided into several areas.

Area 1 covers $SiO_2$ concentrations of less than 35% and $Al_2O_3$ concentrations of less than 70% by weight. This area corresponds to industrial Portland and aluminous cements. They are mainly composed of crystalline phases (di- and tricalcium silicates: C2S and C3S, calcium aluminates: C3A, C12A7, CA).

Area 2 includes blast furnace slag (a by-product of the cast iron industry) the vitreous structure of which, caused by rapid cooling, renders it potentially hydraulic. This area also includes compositions that appear in U.S. Pat. No. 4,605,443 quoted above (Area 5).

Area 4 corresponds to pozzolanic products (natural and artificial pozzolana, fly ash, etc.). These products also have better reactivity when they are amorphous. Area 3 corresponds to products with high melting points and very low hydraulic activity.

Why is it that in certain areas the crystallised products are better? Why, in other areas, is it necessary to have vitreous products? These are the questions cement chemists have been asking over the last few years.

Progress has been made in these areas, but not enough to have complete knowledge of the system or to be able to optimize it completely.

US patent 2003/0075019 describes the production of slag containing firstly FeO=1.1%, MnO=0.8% and $Cr_2O_3$=0.3% by reduction of a steelworks slag by carbon, and then by using a more powerful reducing agent, the production of a slag containing FeO=0.8%, MnO=0.4% and $Cr_2O_3$=0.07%. The authors claim a slag with a maximum of $Cr_2O_3$ or NiO of 0.15 or 0.08%.

The aim of the steel producer is to recover a maximum quantity of Cr and Ni from the liquid metal, even if this lowers the quality of the mineralogical phase.

On the contrary, the aim of the present invention is to maintain a relatively large quantity of mineral oxides and an appropriate quality of the mineralogical phase.

The object of the present invention is thus to provide a hydraulic mineral composition with a higher activity index.

A further object of the invention is to provide a production method of one such composition, and preferably by using as raw material industrial by-products such as slag, particularly steelworks slag, fly ash and calcinated slurry from sewage plants.

Yet another object of the invention is to provide cementitious products and hydraulic binders containing one such hydraulic mineral composition.

According to the invention, it has been found that by maintaining in a matrix based on calcium and magnesium silico-aluminates the total proportion of certain mineral oxides and, optionally, certain mineral halides, at a level of at least 5% of the weight of the composition, a hydraulic mineral composition with a higher activity index is obtained.

More specifically, the hydraulic mineral composition according to the invention comprises a vitreous or crystallised matrix based on calcium and magnesium silico-aluminates, accounting for at least 25%, and preferably at least 30% by weight of the composition, one or several specific mineral oxides and optionally one or several specific mineral halides selected from oxides and halides of Ti, V, Cr, Mn, Co, Ni, Cu, Pb, Ba, Sr, P, S, Na, K, Zr, Mo, Be, Tl, As, Sn and Cd accounting for at least 5% by weight of the composition, at most 31% by weight of alumina ($Al_2O_3$), less than 10% by weight of ferrite and less than 0.05%, preferably less than 0.01% by weight of C compared with the weight of the composition.

The ferrite is a calcium aluminoferrite which generally corresponds to an iron oxide content in the composition of 0.3 to 5% by weight.

The term hydraulic mineral composition as used in the present invention is understood to mean a composition mainly comprising mineral compounds which reacts with water to give a product comprising stable hydrates and which develops mechanical properties that are stable over time, particularly which has low dimensional variations (expansion, among other things, etc.).

The term vitreous matrix as used in the present invention is understood to mean matrices based on calcium and magnesium silico-aluminates comprising a vitreous phase accounting for at least 80%, and preferably at least 85% by weight of the matrix.

The crystalline matrices of the hydraulic mineral compositions of the invention preferably correspond to mineralogical compositions comprising, compared with the total weight of the matrix:

| Mineralogical composition A | |
| --- | --- |
| dicalcium silicate (C2S) | 5 to 35%, preferably 10 to 30%; |
| monocalcium aluminate (CA) | 20 to 60%, preferably 30 to 55%; |
| melilite (solid solution of gehlenite C2AS and akermanite C2MS2) | 5 to 50%, preferably 10 to 40%; | or

| Mineralogical composition B, | |
| --- | --- |
| dicalcium silicate (C2S) | 20 to 60%, preferably 20 to 50%; |
| calcium aluminate (C12A7) | 20 to 70%, preferably 20 to 60%; and |
| calcium aluminate (C3A) | 0 to 45%, preferably 0 to 40%. |

Further, the mineralogical composition A can comprise preferably as much as 5%, more preferably as much as 0.5% of FeO, as much as 10%, more preferably 3 to 8% of MgO and 0 to 8% of periclase, while the mineralogical composition B can comprise preferably as much as 10%, more preferably as much as 8% by weight of FeO, as much as 10%, more preferably 2 to 5% of MgO and from 0 to 8% of periclase.

As for the vitreous matrices, as indicated above, they comprise at least 80% by weight compared to the total weight of the matrix of a vitreous phase. Obviously, it is not possible to define these vitreous phases by mineralogical phases.

Nevertheless, it is possible to define them by potential mineralogical compositions, that is the mineralogical compositions which would be obtained if, during the production of these hydraulic mineral compositions of the invention, a slow cooling process was used, so as to obtain a crystalline matrix composition, instead of rapid cooling (quenching) that leads to a mainly vitreous matrix composition. Thus vitreous matrices according to the invention can be defined as matrices which would potentially have the following mineralogical compositions in relation to the total weight of the matrix:

| Mineralogical composition A | |
| --- | --- |
| melilite (C2AS/C2MS2) | 10 to 60%; |
| dicalcium silicate (C2S) | 15 to 80%; |
| merwinite (C3MS2) | 3 to 15%; and |
| iron oxides ($FeO/Fe_2O_3$) | 0.5 to 5%; | or:

| Mineralogical composition B, | |
| --- | --- |
| dicalcium silicate (C2S) | 5 to 75%; |
| melilite (C2AS/C2MS2) | 5 to 50%; |
| monocalcium aluminate (CA) | 10 to 45%; |
| iron oxides ($FeO/Fe_2O_3$) | 5 to 20%; |
| periclase | 2 to 10%. |

Preferably, the specific mineral oxides are present in the hydraulic mineral composition of the invention in the following proportions by weight, on condition that these mineral oxides and optional halides account for at least 5% by weight of the composition:

| | |
| --- | --- |
| titanium oxide | 0 to 10%, preferably 0.1 to 10%; |
| vanadium oxide | 0 to 0.5%, preferably 0.2 to 0.5%; |
| chromium oxide | 0 to 0.5%; |
| manganese oxide | 0 to 5%, preferably 0.5 to 5%; |
| zinc oxide | 0 to 2%, preferably 0.1 to 2%; |
| cobalt oxide | 0 to 0.05%, preferably 0.01 to 0.5%; |
| nickel oxide | 0 to 0.5%, preferably 0.01 to 0.5%; |
| copper oxide | 0 to 2%, preferably 0.1 to 2%; |
| lead oxide | 0 to 0.01%, preferably 0.001 to 0.01%; |

-continued

| | |
|---|---|
| barium oxide | 0 to 2%, preferably 0.1 to 2%; |
| strontium oxide | 0 to 2%, preferably 0.1 to 2%; |
| phosphorus oxide | 0 to 2%, preferably 0.1 to 2%; |
| sulphur oxide | 0 to 3%, preferably 0.2 to 3%; |
| sodium oxide | 0 to 10%, preferably 0.5 to 10%; |
| potassium oxide | 0 to 10%, preferably 0.5% to 10%; |
| zirconium oxide | 0 to 0.1%, preferably 0.01 to 0.1%; |
| molybdenum oxide | 0 to 0.1%, preferably 0.01 to 0.1%; |
| thallium oxide | 0 to 0.1%, preferably 0.01 to 0.1%; |
| tin oxide | 0 to 0.1%, preferably 0.01 to 0.1%; |
| cadmium oxide | 0 to 0.005%, preferably 0.0002 to 0.005%; and |
| arsenic oxide | 0 to 0.002%, preferably 0.0001 to 0.002%. |

Preferably, the compositions according to the invention comprise sodium, potassium, chromium, nickel, cobalt, phosphorus, zinc, sulphur, titanium, barium, manganese and strontium oxides.

Further, preferably, the compositions according to the invention also contain at least all the specific oxides of the following elements: S, Ti, Mn, Ba, Sr, Zn.

As indicated, apart from the specific mineral oxides, the composition can comprise halides, preferably chlorides, fluorides and iodides corresponding to the mineral oxides listed.

Preferably, these halides are present in quantities of 0.1 to 2% by weight.

Preferably, when the compositions of the invention have a crystalline matrix, the specific mineral oxides and optional halides account for at most 7% of the total weight of the composition.

Also, preferably, when the compositions of the invention have a crystalline matrix, the specific mineral oxides and optional halides account for at most 15% of the total weight of the composition.

The invention also relates to a production method of the compositions according to the invention.

In general, this method comprises:

(a) obtaining a material capable of forming a matrix based on calcium and magnesium silico-aluminates in a proportion of at least 25%, preferably of at least 30% by weight of the final hydraulic mineral composition and containing a quantity of mineral oxides and, optionally of mineral halides, as previously defined, sufficient or insufficient for obtaining in the final hydraulic mineral composition a proportion of at least 5% by weight of the final composition of these mineral oxides and, optionally, mineral halides;

(b) the addition to the material capable of forming the matrix, when this has an insufficient concentration of mineral oxides and optional mineral halides of an additional material containing a quantity of specific mineral oxides and, optionally, of specific mineral halides, as previously defined, sufficient for obtaining in the final hydraulic mineral composition a proportion of at least 5% by weight of these mineral oxides and optional mineral halides;

(c) smelting the material of step (a) when this has a sufficient concentration of mineral oxides and optional mineral halides or the product obtained at step (b) at a temperature of 1450° C. to 1650° C., preferably at a temperature of at least 1500° C., and more preferably of at least 1550° C. in a reducing atmosphere with a partial oxygen pressure equal to or less than $10^{-7}$ atmospheres, preferably such that $10^{-7} \leq pO_2 \leq 10^{-5}$ atmospheres, and (d) recovering the final hydraulic mineral composition.

The final hydraulic mineral composition can be recovered by rapid cooling (quenching), for example in water or in air to obtain a vitreous matrix or by slow cooling to obtain a crystallised matrix. Obviously, the choice of rapid or slow cooling will depend on the chemical and mineralogical composition of the raw material in order to ensure that the final hydraulic mineral composition of the invention is obtained.

The material capable of forming a matrix based on calcium and magnesium silico-aluminates can be any material that makes it possible to obtain this type of matrix in the composition, in particular bauxites, and preferably industrial by-products, particularly those from the steel industry such as slag, particularly steelworks slag, or from electric power stations such as fly ash or from other industries such as calcinated slurry from sewage plants, furnace dust and quarry fines from cement plants and filter dusts such as dust from steelworks filters.

As an indication, Tables I, II, III and IV list in % by weight the usual mineralogical and/or chemical compositions of steelworks slag, fly ash, bauxites and calcinated slurry from sewage plants.

TABLE I

Steelworks slag
Raw material 1 (steelworks slag)

| | C2S | Ferrite | Free CaO | Wustite | Periclase | C | TiO₂ | V₂O₅ | Cr₂O₃ | MnO |
|---|---|---|---|---|---|---|---|---|---|---|
| Min | 15 | 10 | 1 | 3 | 2 | 0.02 | 0.3 | 0.2 | 0.20 | 0.5 |
| Max | 40 | 50 | 15 | 20 | 15 | 0.3 | 1.5 | 0.5 | 20.00 | 10 |

| | ZnO | CoO | NiO | CuO | PbO | BaO | SrO | P₂O₅ | S | Na2O |
|---|---|---|---|---|---|---|---|---|---|---|
| Min | 0.01 | 0.0001 | 0.01 | 0.005 | 0.0001 | 0.001 | 0.001 | 0.05 | 0.01 | 0.05 |
| Max | 0.5 | 0.001 | 0.5 | 0.5 | 0.005 | 0.5 | 0.05 | 2 | 2.00 | 0.5 |

| | K₂O | ZrO₂ | MoO | BeO | Tl | Sn₂O₃ | As₂O₃ | CdO | Cl | F |
|---|---|---|---|---|---|---|---|---|---|---|
| Min | 0.02 | 0.02 | 0.0001 | 0.0001 | 0 | 0.0001 | 0.0001 | 0.0001 | 0.05 | 0.0001 |
| Max | 0.5 | 0.5 | 0.001 | 0.001 | 0.0005 | 0.2 | 0.005 | 0.05 | 2.00 | 0.5 |

TABLE II

Fly Ash
Raw material 2 (Fly ash)

|     | CaO | SiO$_2$ | Al$_2$O$_3$ | MgO | Fe$_2$O$_3$ | C | TiO$_2$ | V$_2$O$_5$ | Cr$_2$O$_3$ | MnO |
|-----|-----|---------|-------------|-----|-------------|---|---------|------------|-------------|-----|
| Min | 0.4 | 14 | 4 | 0.5 | 2 | 0.5 | 0.5 | 0 | 0.00 | 0 |
| Max | 40 | 65 | 35 | 10 | 20 | 26 | 4 | 0.5 | 0.10 | 0.5 |

|     | ZnO | CoO | NiO | CuO | PbO | BaO | SrO | P$_2$O$_5$ | S | Na$_2$O |
|-----|-----|-----|-----|-----|-----|-----|-----|------------|---|---------|
| Min | 0 | 0 | 0 | 0 | 0 | 0 | 0 | 0.1 | 0.00 | 0.04 |
| Max | 0.2 | 0.05 | 0.15 | 0.03 | 0.3 | 2 | 2 | 2 | 8.00 | 11 |

|     | K$_2$O | ZrO$_2$ | MoO | BeO | Tl | Sn$_2$O$_3$ | As$_2$O$_3$ | CdO | Cl | F |
|-----|--------|---------|-----|-----|----|-------------|-------------|-----|-----|---|
| Min | 0.1 | 0 | 0 | 0 | 0 | 0 | 0 | 0 | 0.00 | 0 |
| Max | 5 | 0.1 | 0.05 | 0.05 | 0.05 | 0.05 | 0.1 | 5 | 0.50 | 0.5 |

TABLE III

Bauxites
Raw material 3 (Bauxite)

|     | CaO | SiO$_2$ | Al$_2$O$_3$ | MgO | Fe$_2$O$_3$ | C | TiO$_2$ | V$_2$O$_5$ | Cr$_2$O$_3$ | MnO |
|-----|-----|---------|-------------|-----|-------------|---|---------|------------|-------------|-----|
| Min | 0.2 | 0 | 30 | 0 | 0 | 0 | 0.02 | 0 | 0.00 | 0 |
| Max | 10 | 35 | 80 | 2 | 35 | 2 | 5 | 1 | 2.00 | 2 |

|     | ZnO | CoO | NiO | CuO | PbO | BaO | SrO | P$_2$O$_5$ | S | Na$_2$O |
|-----|-----|-----|-----|-----|-----|-----|-----|------------|---|---------|
| Min | 0 | 0 | 0 | 0 | 0 | 0 | 0 | 0.1 | 0.00 | 0.04 |
| Max | 3 | 0.03 | 0.15 | 0.03 | 0.3 | 2 | 2 | 2 | 6.00 | 5 |

|     | K$_2$O | ZrO$_2$ | MoO | BeO | Tl | Sn$_2$O$_3$ | As$_2$O$_3$ | CdO | Cl | F |
|-----|--------|---------|-----|-----|----|-------------|-------------|-----|-----|---|
| Min | 0.1 | 0 | 0 | 0 | 0 | 0 | 0 | 0 | 0.00 | 0 |
| Max | 5 | 0.1 | 0.05 | 0.05 | 0.05 | 0.05 | 0.1 | 1 | 1.50 | 0.25 |

TABLE IV

Calcinated slurry from sewage plants
Raw material 4 (Calcinated slurry from sewage plants)

|     | CaO | SiO2 | Al2O3 | MgO | Fe2O3 | C | TiO2 | V2O5 | Cr2O3 | MnO |
|-----|-----|------|-------|-----|-------|---|------|------|-------|-----|
| Min | 20 | 10 | 5 | 0 | 2 | 0 | 0.02 | 0 | 0.20 | 0 |
| Max | 30 | 35 | 20 | 5 | 15 | 2 | 5 | 0.5 | 2.00 | 2 |

|     | ZnO | CoO | NiO | CuO | PbO | BaO | SrO | P2O5 | S | Na2O |
|-----|-----|-----|-----|-----|-----|-----|-----|------|---|------|
| Min | 0 | 0 | 0 | 0 | 0 | 0 | 0 | 0.1 | 0.50 | 0.04 |
| Max | 3 | 0.03 | 0.15 | 0.5 | 0.5 | 2 | 1 | 5 | 10.00 | 5 |

|     | K2O | ZrO2 | MoO | BeO | Tl | Sn2O3 | As2O3 | CdO | Cl | F |
|-----|-----|------|-----|-----|----|-------|-------|-----|-----|---|
| Min | 0.1 | 0 | 0 | 0 | 0 | 0 | 0 | 0 | 0.00 | 0 |
| Max | 5 | 0.3 | 0.05 | 0.05 | 0.05 | 0.05 | 0.1 | 1 | 1.50 | 0.25 |

It was noted that the unburnt carbon in the material capable of forming the matrix based on calcium and magnesium aluminate and the material added optionally to make up the concentration of specific minerals, in particular fly ash, plays a major role in the reduction process of the invention method. This is because this residual carbon contained in the material has a limited reducing power (in terms of reduction kinetics of the metallic oxides) but has the power to locally maintain reducing properties in the medium, which prevents the presence of metal oxides at high degrees of oxidation and thus makes it possible to control the dissolving of certain oxides, particularly Cr VI oxides.

Thus, preferably, a proportion by weight of 0.05 to 5 is maintained of the unburnt carbon in the material capable of forming the matrix and the materials added optionally to the carbon of the reducing agent added in the process, for example coal or anthracite, in order to create a reducing atmosphere.

The weight of unburnt carbon present in the material capable of forming the matrix and the material added optionally can be determined by measuring the loss on ignition (LOI) of these materials.

The carbon of the reducing agent can be determined by carbon analysis methods (Leco device, for example).

The loss on ignition (LOI) is the variation in weight (usually loss) of a sample heated to 975° C. in air (EN standard 1962). In certain cases, this can be measured in an inert gas (in order to avoid oxidation).

Smelting of the material capable of forming the silico-aluminous matrix of the invention is carried out at a temperature of at least 1450° C., preferably at least 1500° C., and more preferably 1550° C., but under 1650° C. to avoid the specific oxides volatising.

The smelting is carried out in a controlled reducing atmosphere with a partial oxygen pressure equal to or less than $10^{-5}$ atmospheres, preferably such that $10^{-7} \leq pO_2 \leq 10^{-5}$ atmospheres, in order to avoid total reduction of the oxides.

As indicated previously, there are two possibilities for manufacturing the composition of the invention depending on the raw material capable of forming the silico-aluminate matrix.

In the first case, this raw material already contains a sufficient quantity of specific oxides and optional halides to obtain the required final concentration, so it is only necessary to carry out the smelting in a controlled reducing atmosphere according to the invention in order to obtain the final hydraulic composition.

In the second case, the raw material does not contain sufficient oxides and optional halides to obtain the required final concentration, and so before smelting or during the smelting of the raw material, additional material is added containing a sufficient quantity of specific mineral oxides and optional mineral halides for obtaining in the final hydraulic mineral composition a proportion of at least 5% by weight of these mineral oxides and optional mineral halides.

This additional material can be any material containing one or several specific mineral oxides and optional mineral halides, which do not decrease the hydraulic properties of the final composition, and in particular residues from steelworks, power stations, cement plants and the chemical industry.

The hydraulic mineral compositions according to the invention can be used as they are as cement or hydraulic binders or they can be combined with all cementitious products and hydraulic binders, such as Portland cement, aluminous cement, natural and synthetic gypsum plaster, phosphogypsum and mixtures of these.

In general, they can be combined with these cementitious products and hydraulic binders up to 80% by weight, preferably 50% by weight, compared with the total weight of product obtained.

The following examples illustrate the present invention without being limitative.

In these examples, all percentages and quantities are by weight unless otherwise indicated.

EXAMPLE 1

The two raw materials of chemical and mineralogical compositions that figure in Table V below were mixed in a 70/30 ratio. The first is a residue from steel manufacture, and the second is an electric power plant residue.

The silico-aluminate matrix is produced by smelting at 1550° C. in a confined atmosphere in order to keep part of the mineral oxides of the raw materials. By quenching in water it is possible to maintain the matrix in a vitreous state >86%. By quenching in air it is possible to obtain the matrix in a vitreous state (glassy content equal to 86%).

The mineralogical and chemical compositions of the final composition and of a control composition are also given in Table V.

TABLE V

| Raw material 1 steelworks slag | | | | | | | | | |
|---|---|---|---|---|---|---|---|---|---|
| C2S | Ferrite | CaO L | Wustite | Periclase | C | TiO2 | V2O5 | Cr2O3 | MnO |
| 40.13 | 20.84 | 10.52 | 13.81 | 5.2 | 0.09 | 0.59 | 0.345 | 0.88 | 4.73 |
| ZnO | CoO | NiO | CuO | PbO | BaO | SrO | P2O5 | S | Na2O |
| 0.03 | 0.0005 | 0.025 | 0.014 | 0.002 | 0.06 | 0.02 | 1.26 | 0.09 | 0.18 |
| K2O | ZrO2 | MoO | BeO | Tl | Sn2O3 | As2O3 | CdO | Cl | F |
| 0.05 | 0.03 | 0.0003 | 0.0004 | 0.0001 | 0.007 | 0.002 | 0.003 | 1.08 | 0.011 |
| Raw material 2 fly ash | | | | | | | | | |
| Glass | quartz | Periclase | C | TiO2 | V2O5 | Cr2O3 | MnO | | |
| 82 | 2 | 5 | 5.83 | 0.92 | 0.06 | 0.01 | 0.1 | | |
| ZnO | CoO | NiO | CuO | PbO | BaO | SrO | P2O5 | S | Na2O |
| 0.04 | 0.003 | 0.043 | 0.021 | 0.02 | 0.05 | 0.02 | 0.35 | 0.14 | 0.62 |
| K2O | ZrO2 | MoO | BeO | Tl | Sn2O3 | As2O3 | CdO | Cl | F |
| 2.49 | 0.019 | 0.0003 | 0.0004 | 0.0001 | 0.01 | 0.007 | 0.02 | 0.2162 | 0.01 |
| Final product | | | | | | | | | |
| Glass | Merwinite | Melilite | FeO | Periclase | C | TiO2 | V2O5 | MnO | Cr2O3 |
| 86 | 2.63 | 3.1 | 0.82 | 1.8 | 0 | 0.7234 | 0.3413 | 1.3416 | 0.1973 |
| ZnO | CoO | NiO | CuO | PbO | BaO | SrO | P2O5 | S | Na2O |

TABLE V-continued

| 0.0329 | 0.0016 | 0.0132 | 0.0193 | 0.0456 | 0.075 | 0.0263 | 1.2982 | 0.1381 | 0.1998 |
|---|---|---|---|---|---|---|---|---|---|
| K2O | ZrO2 | MoO | BeO | Tl | Sn2O3 | As2O3 | CdO | Cl | F |
| 1.0259 | 0.0351 | 0.0004 | 0.0005 | 0.0001 | 0.0111 | 0.0013 | 0.0026 | 0.1052 | 0.0142 |

Control

| Glass | Merwinite | Melilite | FeO | Periclase | CO2 | TiO2 | V2O5 | MnO | Cr2O3 |
|---|---|---|---|---|---|---|---|---|---|
| 89 | 1.63 | 4 | 1.5 | 0.9 | 0.3 | 0.49 | 0.05 | 0.39 | 0.01 |
| ZnO | CoO | NiO | CuO | PbO | BaO | SrO | P2O5 | S | Na2O |
| 0.01 | 0.0008 | 0.005 | 0.0006 | 0.005 | 0.05 | 0.023 | 0.01 | 0.96 | 0.276 |
| K2O | ZrO2 | MoO | BeO | Tl | Sn2O3 | As2O3 | CdO | Cl | F |
| 0.38 | 0.003 | 0.0003 | 0 | 0 | 0.006 | 0.0003 | 0 | 0 | 0 |

The final composition obtained was ground at 4500 cm$^2$/g and the reactivity index (ASTM C 989) was measured.

The same measurement was carried out on a silico-aluminate matrix containing less than 3% of minor components (control).

Table VI below gives the results.

TABLE VI

Activity index A.I.

| | % oxides and optional halides | A.I. 1 day | A.I. 2 days | A.I. 7 days | A.I. 28 days |
|---|---|---|---|---|---|
| invention | 6.89% | 46 | 62 | 88 | 105 |
| Control | 2.97% | 41 | 50 | 78 | 93 |

EXAMPLE 2

Compositions according to the invention were manufactured with a matrix based on C2S, CA, C2AS (N°1 and 2 Table VI) or C2S, C12A7 (N°3 Table VI) or C2S, C12A7, C3A (N°4, 5, 6 Table VIII) by smelting at 1500° C. and crystallization by slow cooling of a mixture of slag, bauxite and lime.

The chemical compositions of the slag and bauxite are given in Table VII.

The proportions of slag, bauxite and lime used, and the chemical and mineralogical compositions of the final compositions according to the invention are shown in Table VIII.

TABLE VII

| | SLAG | BAUXITE |
|---|---|---|
| SiO2 | 14.00 | 11.69 |
| CaO | 45.54 | 4.39 |
| Al2O3 | 1.16 | 57.75 |
| Fe2O3 | 24.61 | 21.60 |
| MgO | 5.20 | 0.43 |
| C | 0.09 | 0.00 |
| S | 0.09 | 0.08138 |
| MnO | 4.73 | 0.25575 |
| Cr2O3 | 0.88 | 0.23250 |
| TiO2 | 0.59 | 2.72030 |
| K2O | 0.05 | 0.16275 |
| Na2O | 0.18 | 0.16275 |

TABLE VII-continued

| | SLAG | BAUXITE |
|---|---|---|
| P2O5 | 1.26 | 0.13950 |
| ZrO2 | 0.03 | 0.02000 |
| SrO | 0.02 | 0.00200 |
| V2O5 | 0.345 | 0.12788 |
| BaO | 0.06 | 0.11625 |
| Cl | 1.08 | 0.05000 |
| F | 0.01 | 0.00600 |
| CuO | 0.012 | 0.00500 |
| CdO | 0.003 | 0.00010 |
| ZnO | 0.03 | 0.02500 |
| Sn2O3 | 0.0078 | 0.00550 |
| As2O3 | 0.0002 | 0.00010 |
| NiO | 0.02 | 0.01500 |
| PbO | 0.002 | 0.00120 |

TABLE VIII

| | N°1 | N°2 | N°3 | N°4 | N°5 | N°6 |
|---|---|---|---|---|---|---|
| Slag | 32 | 28 | 15 | 16 | 45 | 72 |
| Bauxite | 53 | 53 | 47 | 45 | 35 | 22 |
| Lime | 14 | 19 | 38 | 39 | 20 | 6 |
| C2S | 14.0 | 28.2 | 30.7 | 23.4 | 36.8 | 47.1 |
| CA | 37.7 | 51.8 | | | | |
| C2AS | 36.0 | 10.0 | | | | |
| C12A7 | | | 58.7 | 27.0 | 38.6 | 26.2 |

TABLE VIII-continued

|      | N°1    | N°2    | N°3    | N°4    | N°5    | N°6    |
|------|--------|--------|--------|--------|--------|--------|
| C3A  |        |        |        | 39.7   | 14.4   | 13.1   |
| Fe2O3 | 0.4210 | 0.4210 | 1.4883 | 0.9012 | 0.9008 | 4.9056 |
| MgO  | 5.9533 | 4.0733 | 4.0342 | 3.8860 | 2.9963 | 2.5556 |
| S    | 0.4377 | 0.2663 | 0.5623 | 0.6452 | 0.2490 | 0.2214 |
| MnO  | 0.7093 | 0.6110 | 0.9923 | 0.1985 | 1.7725 | 0.8267 |
| Cr2O3 | 0.2868 | 0.3290 | 0.0331 | 0.4467 | 0.2783 | 0.3100 |
| TiO2 | 2.6713 | 2.7261 | 2.4312 | 2.1588 | 1.9629 | 1.9781 |
| K2O  | 0.1811 | 0.1567 | 0.1323 | 0.2481 | 0.1465 | 0.1476 |
| Na2O | 0.0453 | 0.0157 | 0.0000 | 0.0248 | 0.0293 | 0.0590 |
| P2O5 | 0.1509 | 0.0783 | 0.0662 | 0.0248 | 0.2197 | 0.1771 |
| ZrO2 | 0.1056 | 0.1097 | 0.0992 | 0.0993 | 0.0586 | 0.0590 |
| SrO  | 0.0604 | 0.0627 | 0.0496 | 0.0744 | 0.0439 | 0.0443 |
| V2O5 | 0.3319 | 0.3149 | 0.2064 | 0.3176 | 0.3674 | 0.5458 |
| BaO  | 0.1505 | 0.1502 | 0.1174 | 0.1744 | 0.1243 | 0.1357 |
| Cl   | 0.6931 | 0.6300 | 0.3423 | 0.5501 | 0.9248 | 1.5565 |
| F    | 0.0119 | 0.0115 | 0.0080 | 0.0121 | 0.0121 | 0.0168 |
| CuO  | 0.0121 | 0.0115 | 0.0077 | 0.0117 | 0.0131 | 0.0192 |
| CdO  | 0.0019 | 0.0017 | 0.0009 | 0.0015 | 0.0025 | 0.0043 |
| ZnO  | 0.0464 | 0.0411 | 0.0305 | 0.0452 | 0.0402 | 0.0460 |
| Sn2O3 | 0.0101 | 0.0098 | 0.0069 | 0.0109 | 0.0100 | 0.0135 |
| As2O3 | 0.0002 | 0.0002 | 0.0001 | 0.0002 | 0.0002 | 0.0003 |
| NiO  | 0.0267 | 0.0260 | 0.0185 | 0.0280 | 0.0262 | 0.0349 |
| PbO  | 0.0024 | 0.0023 | 0.0016 | 0.0024 | 0.0024 | 0.0034 |

Product N°1 ground to 4500 Blaine is mixed with water (W/C=0.35) containing a retarder (0.1% by weight of sodium citrate). Compressive strengths are then 5 MPa at 6 hours, 20 MPa at 24 hours.

Product N°2 ground to 4500 Blaine is mixed with water (W/C=0.35) containing a retarder (0.1% by weight of sodium citrate). Compressive strengths are 10 MPa at 6 hours, 30 MPa at 24 hours.

Product N°3 ground to 4000 cm²/g (100 g) is mixed with Portland cement, (100 g) fine sand (<40 µm) chalk (250 g) anhydrite (125 g) a cellulose (e.g. Tylose H 300 p by Hoechst) lithium carbonate (0.8 g) tartaric acid (1 g) and an additive of the type Melment F10. The water requirement is 22 cm³ and the slump is 155 mm at the start and after 15 minutes. The mixture has self-levelling properties. Setting time is 20 minutes and the product can be tiled over after 2.5 hours.

Product N°4 ground to 4500 cm²/g is mixed with Portland cement, anhydrite, fine sand (<40 µm) a methyl cellulose, a polyvinyl alcohol, lithium carbonate and sodium citrate in the ratio (7/25/3/63/0.5/0.2/0.5/0.5). Workability time obtained is 15 minutes and hardening time is 30 minutes.

Product N°5 ground to 4500 cm²/g is mixed with 40% of vitrified industrial blast furnace slag, anhydrite (10%), fine sand (<40 µm), and sodium citrate (0.05%). Compressive strengths obtained at 6 and 24 hours are 20 and 40 MPa.

Product N°6, ground to 4500 cm²/g is mixed with fly ash (30%) from power stations (Carling), anhydrite (10%), fine sand (<40 µm), and sodium citrate (0.2%). Compressive strengths obtained at 6 and 24 hours are 15 and 30 MPa.

Melment F10 is a melamine formaldehyde condensate marketed by Degussa.

Compressive strengths were measured as per standard: NF EN 196-1.

Setting time and water requirement were measured as per standard: NF EN 196-3.

Slump was measured as per standard P18 451.

The invention claimed is:

1. A hydraulic mineral composition comprising:
a vitreous or crystallised matrix based on calcium and magnesium silico-aluminates, accounting for at least 25% by weight of the composition,
mineral oxides and optionally one or several mineral halides selected from oxides and halides of Ti, V, Cr, Mn, Co, Ni, Cu, Pb, Ba, Sr, P, S, Na, K, Zr, Mo, Be, Tl, As, Sn and Cd, a total amount of said mineral oxides and optionally one or several mineral halides accounting for at least 5% by weight of the composition,
at most 31% by weight of alumina (Al$_2$O$_3$),
less than 10% by weight of ferrite (calcium aluminoferrite), and
less than 0.05% by weight of C compared with the weight of the composition,
wherein, in % by weight compared to the total weight of the composition, said mineral oxides comprise
titanium oxide from 0.1 to 10%;
vanadium oxide from 0.2 to 0.5%;
chromium oxide from 0 to 0.5%;
manganese oxide from 0.5 to 5%;
cobalt oxide from 0.01 to 0.5%;
nickel oxide from 0.01 to 0.5%;
copper oxide from 0.1 to 2%;
lead oxide from 0.001 to 0.01%;
barium oxide from 0.1 to 2%;
strontium oxide from 0.1 to 2%;
phosphorus oxide from 0.1 to 2%;
sulphur oxide from 0.2 to 3%;
sodium oxide from 0.5 to 10%;
potassium oxide from 0.5% to 10%;
zirconium oxide from 0.01 to 0.1%;
molybdenum oxide from 0.01 to 0.1%;
thallium oxide from 0.01 to 0.1%;
tin oxide from 0.01 to 0.1%;
cadmium oxide from 0.0002 to 0.005%; and
arsenic oxide from 0.0001 to 0.002%, and
wherein in % by weight compared to the total weight of the composition, the composition comprises zinc oxide from 0.1 to 2%.

2. A hydraulic mineral composition according to claim 1, wherein the optional one or several halides are selected from chlorides, fluorides and iodides.

3. A hydraulic mineral composition according to claim 1, wherein the mineral oxides include chromium oxide.

4. A hydraulic mineral composition according to claim 1, wherein the matrix is a crystallised matrix, and
wherein the mineral oxides and the optional one or several mineral halides account for at most 7% of the total weight of the composition.

5. A hydraulic mineral composition comprising:
a vitreous or crystallised matrix based on calcium and magnesium silico-aluminates, accounting for at least 25% by weight of the composition,
one or several mineral oxides and optionally one or several mineral halides selected from oxides and halides of Ti, V, Cr, Mn, Co, Ni, Cu, Pb, Ba, Sr, P, S, Na, K, Zr, Mo, Be, Tl, As, Sn and Cd, a total amount of said one or several mineral oxides and optionally one or several mineral halides accounting for at least 5% by weight of the composition,
at most 31% by weight of alumina (Al$_2$O$_3$),
less than 10% by weight of ferrite (calcium aluminoferrite), and
less than 0.05% by weight of C compared with the weight of the composition,
wherein the matrix is crystallised and comprises, compared with the total weight of the matrix:
Mineralogical composition A
dicalcium silicate (C2S) 5 to 35%;
monocalcium aluminate (CA) 20 to 60%; and
melilite (solid solution of gehlenite C2AS and akermanite C2MS2) 5 to 50%; or
Mineralogical composition B,
    dicalcium silicate (C2S) 20 to 60%;
    calcium aluminate (C12A7) 20 to 70%; and
    calcium aluminate (C3A) 0 to 45%.

6. A cementitious product or hydraulic binder, comprising up to 80% by weight compared to the total weight of the product obtained of a hydraulic mineral composition according to claim 1.

7. A cementitious product or hydraulic binder according to claim 6, wherein the complement to the hydraulic mineral composition is selected from Portland cement, aluminous cements, natural and synthetic gypsum plasters, phosphogypsums and mixtures of these.

8. A production method of a hydraulic mineral composition according to claim 1, the method comprising:
- (a) providing a material capable of forming a matrix based on calcium and magnesium silico-aluminates in a proportion of at least 25% by weight of the hydraulic mineral composition;
- (b) if said material has an insufficient amount of mineral oxides and optionally one or more mineral halides as defined in claim 1, adding to said material an additional material such that said material and said additional material include a total amount of mineral oxides and optionally one or more mineral halides as defined in claim 1; weight of these mineral oxides and optional
- c) smelting said material of step (a) if said material includes a total amount of mineral oxides and optionally one or more mineral halides as defined in claim 1 or smelting said material and said additional material obtained at step (b) if said material has an insufficient amount of mineral oxides and optionally one or more mineral halides as defined in claim 1, said smelting performed at a temperature of 1450° C. to 1650° C. in a reducing atmosphere with a partial oxygen pressure of $10^{-7} \leq pO_2 \leq 10^{-5}$ atmospheres, and
- (d) recovering the hydraulic mineral composition.

9. A method according to claim 8, wherein the material capable of forming a matrix based on calcium and magnesium silico-aluminates is selected from steelworks slag and dust from industrial furnaces and power stations.

10. A method according to claim 8, wherein a proportion by weight of unburnt carbon in the material capable of forming the matrix and in the optional additional material compared with the carbon of the reducing agent added to obtain the reducing atmosphere ranges from 0.02 to 5.

11. A method according to claim 8, wherein the additional material is selected from residues from steelworks, power stations, cement plants and the chemical industry.

12. A hydraulic mineral composition according to claim 1, wherein the vitreous or crystallised matrix based on calcium and magnesium silico-aluminates, accounts for at least 30% by weight of the composition.

13. A hydraulic mineral composition according to claim 1, comprising less than 0.01% by weight of C compared with the weight of the composition.

14. A hydraulic mineral composition according to claim 5, wherein the matrix comprises, compared with the total weight of the matrix:
Mineralogical composition A
    dicalcium silicate (C2S) 10 to 30%;
    monocalcium aluminate (CA) 30 to 55%; and
    melilite (solid solution of gehlenite
C2AS and akermanite C2MS2) 10 to 40%; or
Mineralogical composition B,
    dicalcium silicate (C2S) 20 to 50%;
    calcium aluminate (C12A7) 20 to 60%; and
    calcium aluminate (C3A) 0 to 40%.

\* \* \* \* \*